United States Patent
Manouvrier et al.

(10) Patent No.: US 10,126,499 B2
(45) Date of Patent: Nov. 13, 2018

(54) ELECTRO-OPTIC DEVICE WITH SEMICONDUCTOR JUNCTION AREA AND RELATED METHODS

(71) Applicants: STMICROELECTRONICS SA, Montrouge (FR); STMICROELECTRONICS (CROLLES 2) SAS, Crolles (FR)

(72) Inventors: Jean-Robert Manouvrier, Echirolles (FR); Jean-Francois Carpentier, Grenoble (FR); Patrick Lemaitre, Biviers (FR)

(73) Assignees: STMICROELECTRONICS SA, Montrouge (FR); STMICROELECTRONICS (CROLLES 2) SAS, Crolles (FR)

( * ) Notice: Subject to any disclaimer, the term of this patent is extended or adjusted under 35 U.S.C. 154(b) by 159 days.

(21) Appl. No.: 14/754,994

(22) Filed: Jun. 30, 2015

(65) Prior Publication Data

US 2017/0003449 A1    Jan. 5, 2017

(51) Int. Cl.
  *G02B 6/34*    (2006.01)
  *G02B 6/124*   (2006.01)
  *G02B 6/30*    (2006.01)
  *G02B 6/293*   (2006.01)

(52) U.S. Cl.
  CPC ........... *G02B 6/124* (2013.01); *G02B 6/30* (2013.01); *G02B 6/29395* (2013.01)

(58) Field of Classification Search
  None
  See application file for complete search history.

(56) References Cited

U.S. PATENT DOCUMENTS

| | | | |
|---|---|---|---|
| 5,425,116 A | 6/1995 | Dragone et al. | |
| 5,805,743 A * | 9/1998 | Iwamoto | G02F 1/335 385/10 |
| 6,055,348 A | 4/2000 | Jin et al. | |
| 8,805,136 B2 | 8/2014 | El-Sherif | |
| 2013/0016744 A1 | 1/2013 | Li et al. | |
| 2014/0185980 A1 | 7/2014 | Lei et al. | |
| 2015/0086149 A1 * | 3/2015 | Zheng | G02F 1/025 385/2 |

* cited by examiner

*Primary Examiner* — Chris Chu
(74) *Attorney, Agent, or Firm* — Slater Matsil, LLP

(57) ABSTRACT

An electro-optic device may include a photonic chip having an optical grating coupler at a surface. The optical grating coupler may include a first semiconductor layer having a first base and first fingers extending outwardly from the first base. The optical grating coupler may include a second semiconductor layer having a second base and second fingers extending outwardly from the second base and being interdigitated with the first fingers to define semiconductor junction areas, with the first and second fingers having a non-uniform width. The electro-optic device may include a circuit coupled to the optical grating coupler and configured to bias the semiconductor junction areas and change one or more optical characteristics of the optical grating coupler.

16 Claims, 4 Drawing Sheets

ELECTRO-OPTIC DEVICE WITH SEMICONDUCTOR JUNCTION AREA AND RELATED METHODS

TECHNICAL FIELD

The present disclosure relates to the field of photonics, and, more particularly, to an electro-optic device and related methods.

BACKGROUND

Integrated optical devices for directly processing optical signals have become of greater importance as optical fiber communications increasingly replace metallic cable and microwave transmission links. Integrated optical devices can advantageously be implemented as silicon optical circuits having compact dimensions at relatively low cost. Silicon optical circuits employ integrated waveguide structures formed in a silicon layer of a silicon on insulator (SOI) substrates, to form a silicon photonic chip.

In some applications, the optical signal is injected in/extracted from the photonic chip in a near perpendicular fashion, with respect to the photonic chip substrate plane, by means of optical grating couplers formed in the silicon photonic chip for input-output of the photonic signal. When using the silicon substrate in such a coupling fashion, such as when coupling to an optical fiber, the optical fiber is mounted in near perpendicular fashion.

SUMMARY

Generally speaking, an electro-optic device may include a photonic chip having an optical grating coupler at a surface thereof. The optical grating coupler may comprise a first semiconductor layer of a first conductivity type and comprising a first base and a first plurality of fingers extending outwardly therefrom. The optical grating coupler may comprise a second semiconductor layer of a second conductivity type comprising a second base and a second plurality of fingers extending outwardly therefrom and being interdigitated with the first plurality of fingers to define a plurality of semiconductor junction areas. The first and second pluralities of fingers may have a non-uniform width. The electro-optic device may include a circuit coupled to the optical grating coupler and configured to bias the plurality of semiconductor junction areas and change at least one optical characteristic of the optical grating coupler.

In some embodiments, the first plurality of fingers may extend vertically past the second plurality of fingers to define a plurality of recesses respectively aligned with the second plurality of fingers. Also, the first base may have first and second ends, and the first fingers may progressively increase in width from the first end to the second end. The first and second pluralities of fingers may be curved.

Additionally, the photonic chip may comprise first and second terminals coupled respectively to the first and second bases. For example, the at least one optical characteristic comprises at least one of a peak power wavelength, an optical loss, and a refractive index. The electro-optic device may further include an optical element defining an optical path above the optical grating coupler. For example, the optical element may comprise an optical fiber.

Another aspect is directed to an electro-optic device comprising a photonic chip having an optical grating coupler at a surface thereof. The optical grating coupler may include a first semiconductor layer of a first conductivity type, and a second semiconductor layer of a second conductivity type. The first semiconductor layer may include a first base, and a first plurality of ridges extending outwardly from the first base to define a semiconductor junction area. The first plurality of ridges may have a non-uniform width. The electro-optic device may include a circuit coupled to the optical grating coupler and configured to bias the semiconductor junction area and change at least one optical characteristic of the optical grating coupler.

More specifically, the first plurality of ridges may extend vertically to define a plurality of recesses between adjacent ridges. The first base may have first and second ends, and the first ridges may progressively increase in width from the first end to the second end. The first plurality of ridges may be curved.

Another aspect is directed to a method of making an electro-optic device. The method may include forming a photonic chip having an optical grating coupler at a surface thereof. The optical grating coupler may include a first semiconductor layer of a first conductivity type and comprising a first base and a first plurality of fingers extending outwardly therefrom, and a second semiconductor layer of a second conductivity type. The second semiconductor layer may comprise a second base and a second plurality of fingers extending outwardly therefrom and being interdigitated with the first plurality of fingers to define a plurality of semiconductor junction areas. The first and second pluralities of fingers may have a non-uniform width. The method may include coupling a circuit to the optical grating coupler and being configured to bias the plurality of semiconductor junction areas and change at least one optical characteristic of the optical grating coupler.

Another aspect is directed to a method for making an electro-optic device. The method may include forming a photonic chip having an optical grating coupler at a surface thereof. The optical grating coupler may include a first semiconductor layer of a first conductivity type, and a second semiconductor layer of a second conductivity type. The first semiconductor layer may comprise a first base, and a first plurality of ridges extending outwardly from the first base to define a semiconductor junction area, the first plurality of ridges having a non-uniform width. The method may include coupling a circuit to the optical grating coupler and being configured to bias the semiconductor junction area and change at least one optical characteristic of the optical grating coupler.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and prime notation is used to indicate similar elements in alternative embodiments.

Figure 1A:
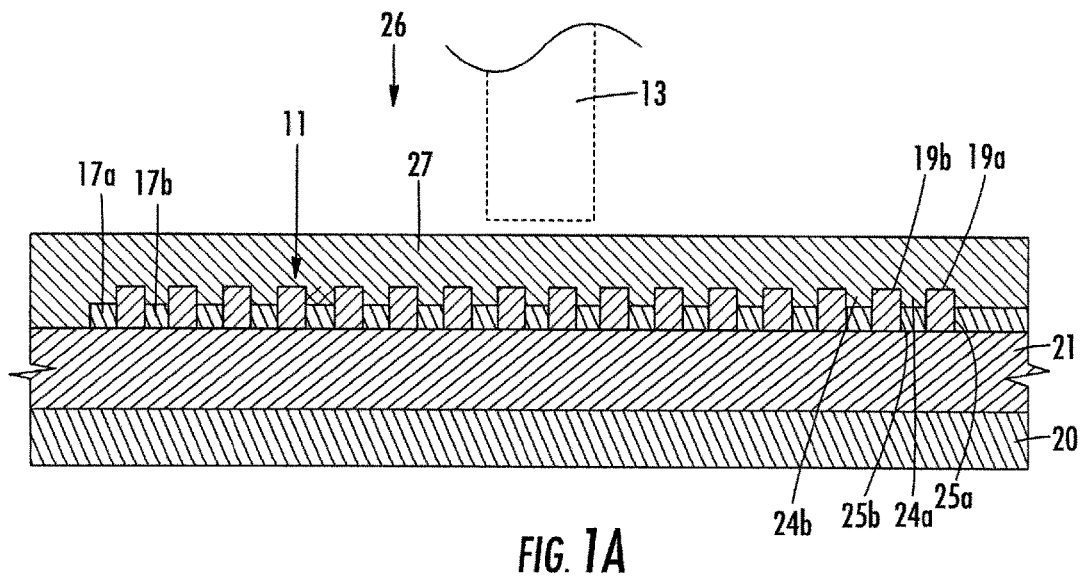
FIG. 1A is a schematic cross-section view of an electro-optic device along line 1A-1A of FIG. 1B, according to the present disclosure.
Figure 1B:
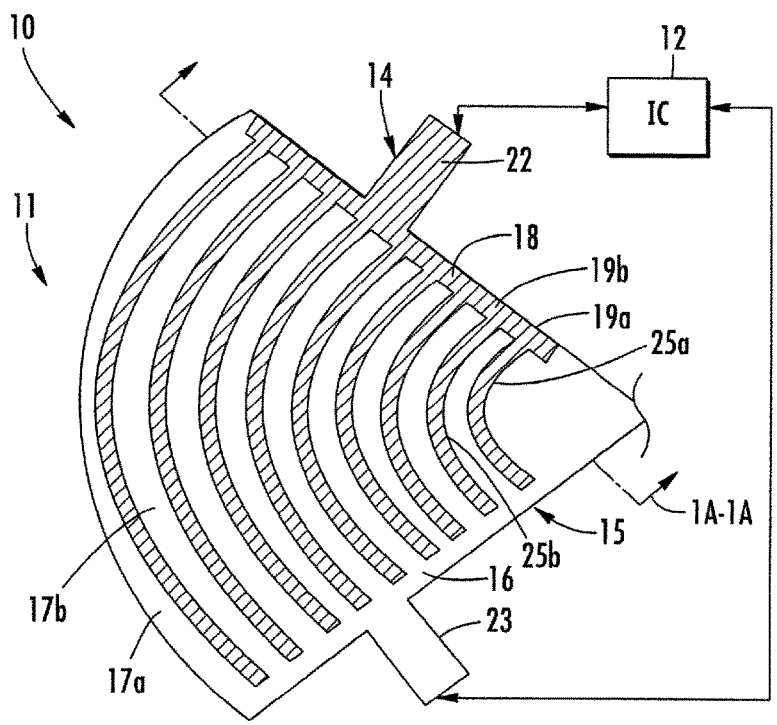
FIG. 1B is a schematic top plan view of the electro-optic device of FIG. 1A.

Referring initially to FIGS. 1A-1B, an electro-optic device 10 according to the present disclosure is now described. The electro-optic device 10 illustratively includes a photonic chip 26 having an optical grating coupler 11 at a surface thereof. The photonic chip 26 illustratively includes a substrate 20, an insulator layer 21 on the substrate, and a layer 27 over the substrate. The layer 27 may comprise a semiconductor stack of dielectric layers.

The optical grating coupler 11 illustratively includes a first semiconductor layer 14 of a first conductivity type (e.g. N-type) and comprising a first base 18 and a first plurality of fingers 19a-19b extending outwardly from the first base. The optical grating coupler 11 illustratively includes a second semiconductor layer 15 of a second conductivity type (e.g. P-type) comprising a second base 16 and a second plurality of fingers 17a-17b extending outwardly from the second base. The first and second semiconductor layers 14, 15 are formed on the insulator layer 21 (i.e. in the illustrated embodiment, a buried oxide (BOX) arrangement).

The second plurality of fingers 17a-17b is interdigitated with the first plurality of fingers 19a-19b to define a plurality of semiconductor junction areas 25a-25b. The first and second pluralities of fingers 19a-19b, 17a-17b have one or more of a non-uniform width (i.e. non-uniform width along the length of each finger and/or each finger having different widths), a non-uniform pitch, and a non-uniform periodicity. In other embodiments, the first and second pluralities of fingers 19a-19b, 17a-17b may have uniform widths. The first and second pluralities of fingers 19a-19b, 17a-17b are curved in the illustrated embodiment. In other embodiments, the first and second pluralities of fingers 19a-19b, 17a-17b may be parallel in rectangular/square shaped patterns, for example.

The electro-optic device 10 illustratively includes an optical element 13 defining an optical path above the optical grating coupler 11. For example, the optical element 13 may comprise an optical fiber, such as a 10 μm fiber core, adjacent to the optical grating coupler 11.

The electro-optic device 10 illustratively includes a circuit (e.g. integrated circuit) 12 coupled to the optical grating coupler 11 and configured to bias the plurality of semiconductor junction areas 25a-25b and change at least one optical characteristic of the optical grating coupler 11. In some embodiments, the circuit 12 and the optical grating coupler 11 are integrated on the same semiconductor device/substrate. In yet other embodiments, the circuit 12 and the optical grating coupler 11 are on separate semiconductor devices. Additionally, the circuit 12 may comprise electro-optic driving circuitry, as will be appreciated by those skilled in the art.

Additionally, the photonic chip 26 illustratively includes first and second terminals (e.g. copper or aluminum) 22, 23 respectively coupled to the first and second bases 18, 16 of the first and second semiconductor layers 14, 15. Via electric biasing, the circuit 12 controls the first and second terminals 22, 23 to change a plurality of optical characteristics of the optical grating coupler 11. The plurality of optical characteristics may comprise, for example, at least one of a peak power wavelength, an optical loss, and a refractive index. In particular, using the first and second terminals 22, 23, the circuit 12 can bias the plurality of semiconductor junction areas 25a-25b to add current flow (direct mode) or a depletion region (lower loss, reverse mode) in the optical grating coupler 11. Also, by biasing the plurality of semiconductor junction areas 25a-25b, the optical grating coupler 11 coupler response will shift (affecting peak wavelength and loss).

In the illustrated embodiment, the first plurality of fingers 19a-19b extend vertically past the second plurality of fingers 17a-17b to define a plurality of recesses 24a-24b respectively aligned with the second plurality of fingers, thereby defining an optical grating coupler. Also, the first base 18 illustratively includes first and second ends, and the first fingers 19a-19b progressively increase in width from the first end to the second end.

Another aspect is directed to a method of making the electro-optic device 10. The method includes forming a photonic chip 26 having an optical grating coupler 11 at a surface thereof. The optical grating coupler 11 includes a first semiconductor layer 14 of a first conductivity type and comprising a first base 18 and a first plurality of fingers 19a-19b extending outwardly therefrom. The optical grating coupler 11 includes a second semiconductor layer 15 of a second conductivity type comprising a second base 16 and a second plurality of fingers 17a-17b extending outwardly therefrom and being interdigitated with the first plurality of fingers 19a-19b to define a plurality of semiconductor junction areas 25a-25b, the first and second pluralities of fingers having a non-uniform width. The method includes coupling a circuit 12 to the optical grating coupler 11 and being configured to bias the plurality of semiconductor junction areas 25a-25b and change at least one optical characteristic of the optical grating coupler 11.

Figure 2A:
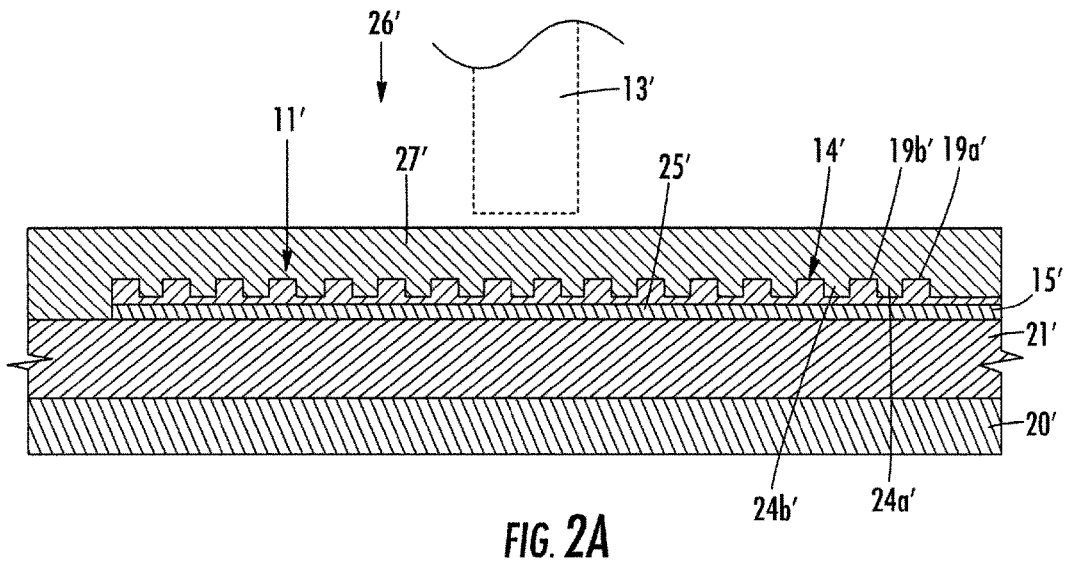
FIG. 2A is a schematic cross-section view of another embodiment of the electro-optic device along line 2A-2A of FIG. 2B, according to the present disclosure.
Figure 2B:
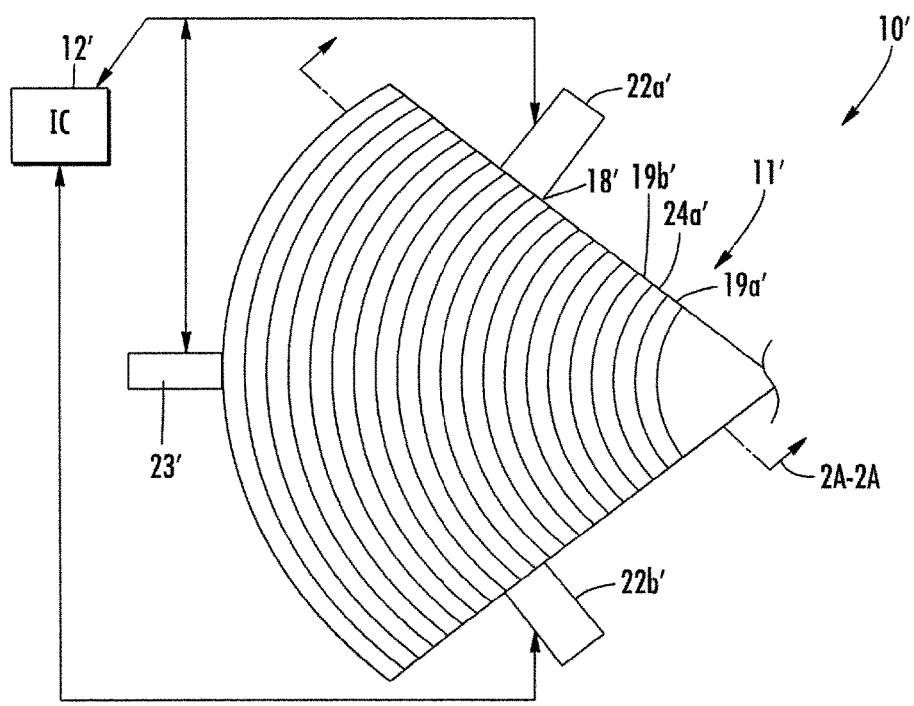
FIG. 2B is a schematic top plan view of the electro-optic device of FIG. 2A.

Referring now additionally to FIGS. 2A-2B, another embodiment of the electro-optic device 10' is now described. In this embodiment of the electro-optic device 10', those elements already discussed above with respect to FIGS. 1A-1B are given prime notation and most require no further discussion herein. This embodiment of the electro-optic device 10' illustratively includes a photonic chip 26' having an optical grating coupler 11' at a surface thereof. The optical grating coupler 11' illustratively includes a first semiconductor layer 14' of a first conductivity type, and a second semiconductor layer 15' of a second conductivity type opposite the first conductivity type. The first semiconductor layer 14' illustratively includes a first base 18', and a first plurality of ridges 19a'-19b' extending outwardly from the first base to define a semiconductor junction area 25'. The first plurality of ridges 19a'-19b' has a non-uniform width. In other embodiments, the first plurality of ridges 19a'-19b' may have a uniform width. The electro-optic device 10' illustratively includes a circuit 12' coupled to the optical grating coupler 11' and configured to bias the semiconductor junction area 25' and change at least one optical characteristic of the optical grating coupler 11'.

More specifically, the first plurality of ridges 19a'-19b' illustratively extend vertically to define a plurality of recesses 24a'-24b' between adjacent pairs of ridges. The first base 18' illustratively includes first and second ends, and the first ridges 19a'-19b' progressively increase in width from the first end to the second end. The first plurality of ridges 19a'-19b' are illustratively curved.

Another aspect is directed to a method for making the electro-optic device 10'. The method includes forming a photonic chip 26' having an optical grating coupler 11' at a surface thereof. The optical grating coupler 11' includes a first semiconductor layer 14' of a first conductivity type, and a second semiconductor layer 15' of a second conductivity type opposite the first conductivity type. The first semiconductor layer 14' illustratively includes a first base 18', and a first plurality of ridges 19a'-19b' extending outwardly from the first base to define a semiconductor junction area 25'. The first plurality of ridges 19a'-19b' illustratively have a non-uniform width. The method includes coupling a circuit 12' to the optical grating coupler 11' and being configured to bias the semiconductor junction area 25' and change at least one optical characteristic of the optical grating coupler 11'.

Figure 3:
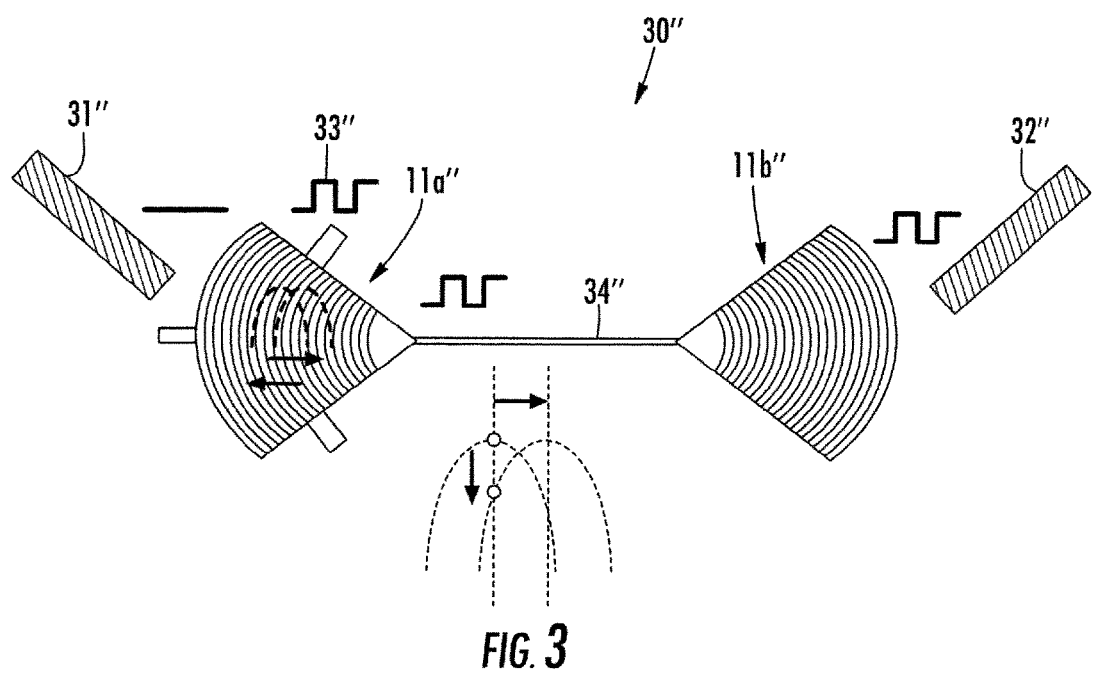
FIG. 3 is a schematic top plan view of an electro-optic system, according to the present disclosure.

Referring now to FIG. 3, an electro-optic system 30" illustratively includes first and second optical grating couplers 11a", 11b", and an optical waveguide 34" coupled between the first and second optical grating couplers. In this example electro-optic system 30", the first optical grating coupler 11a" is similar to the embodiment depicted in FIGS. 2A-2B, and the second optical grating coupler 11b" is similar to a typical optical grating coupler. In this example application, the first optical grating coupler 11a" is configured to receive a constant optical source signal 31", and modulate the constant optical source signal via an electrical command signal 33" applied to the first and second terminals of the first optical grating coupler 11a". The electrical command signal 33" shifts the phase of the constant optical source signal 31". The second optical grating coupler 11b" is configured to generate a modulated optical signal 32".

Figure 4:
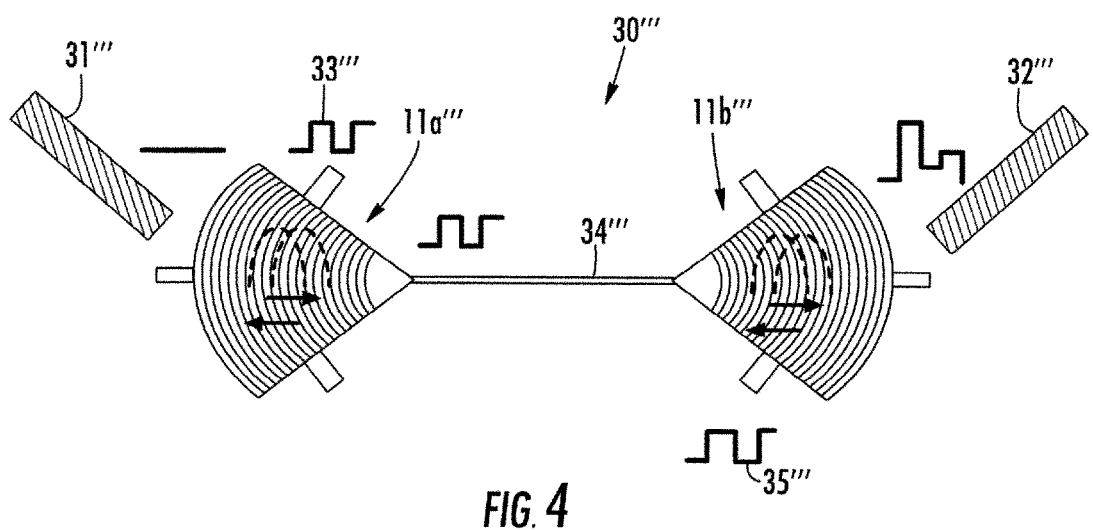
FIG. 4 is a schematic top plan view of another embodiment of the electro-optic system, according to the present disclosure.

Referring now to FIG. 4, an electro-optic system 30''' illustratively includes first and second optical grating couplers 11a''', 11b''', and an optical waveguide 34''' coupled between the first and second optical grating couplers. In this example electro-optic system 30''', the first and second optical grating couplers 11a''', 11b''' are similar to the embodiment depicted in FIGS. 2A-2B. In this example application, the first optical grating coupler 11a''' is configured to receive a constant optical source signal 31''', and modulate the constant optical source signal via an electrical command signal 33''' applied to the first and second terminals of the first optical grating coupler 11a'''. The electrical command signal 33''' shifts the phase of the constant optical source signal 31'''. The second optical grating coupler 11a''' is configured to generate a modulated optical signal 32''', and a modulated electrical signal 35''' at the respective terminals.

Advantageously, the electro-optic device 10 is able to modify or adjust the optical coupler response of the optical grating coupler 11. In some embodiments (FIGS. 3-4), a control loop can be used to provide an optical power modulation. Also, by adding a resistive current path through the optical grating coupler 11, the operational temperature of the optical grating coupler can be increased, thereby affecting one or more optical characteristics. This provides the electro-optic device 10 with greater operational flexibility than typical prior art devices, and also, provides a device capable of adapting optical performance to ambient conditions that affect optical performance.

In FIG. 4, by applying a modulation on both optical grating couplers 11a"-11b" (input, and output), the user can create a 4-level modulation, known as Power Amplitude Modulation (PAM4). That includes generating a signal taking 4 different levels, using two electrical signals, which has the advantage of increasing the data rate without increasing the clock frequency.

Figure 5:
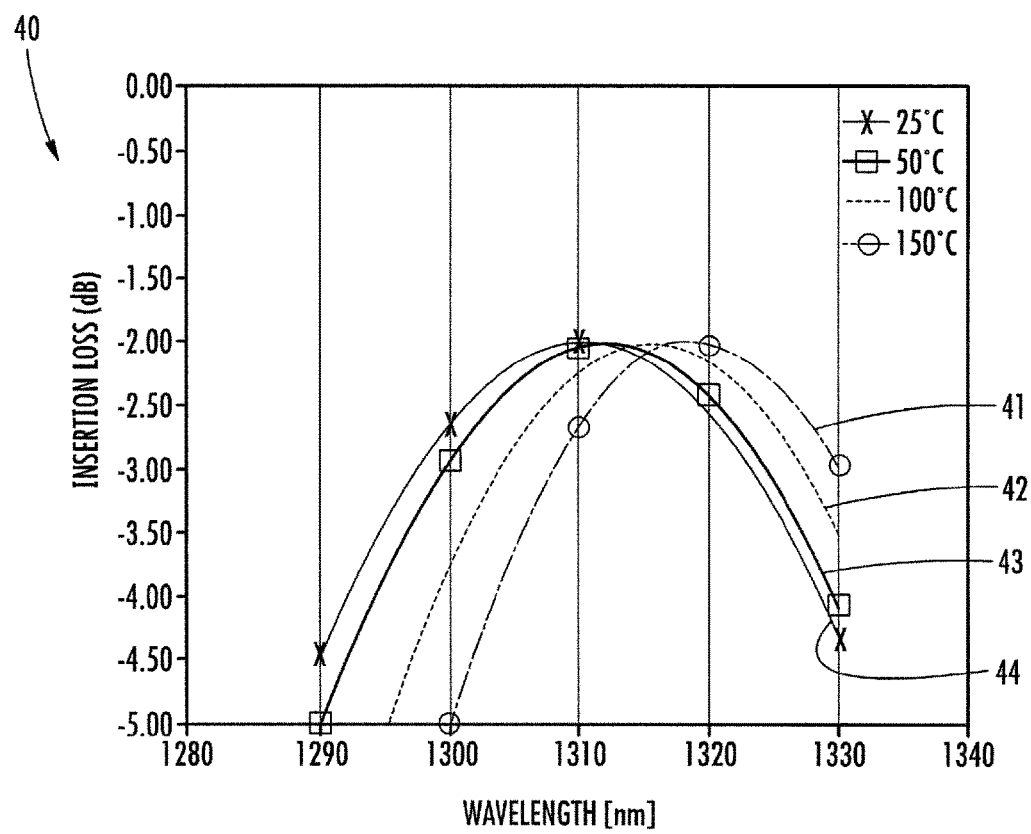
FIG. 5 is a diagram illustrating performance in an example embodiment of the electro-optic device, according to the present disclosure.

Indeed, with reference now to FIG. 5, the diagram 40 illustrates insertion loss at varying wavelengths. In particular, curves 44, 43, 42, 41 respectively demonstrate insertion loss at temperatures of 25° C., 50° C., 100° C., and 150° C., respectively. In the illustrated example, there is a 2 nm peak-wavelength shift for a 25° C. temperature change (i.e. 0.08 nm/° C.).

Compensation of the Temperature Variability (Which Causes Variation of Peak Wavelength)

The characteristic of the optical grating coupler 11 (peak loss, peak wavelength, bandwidth) depends at first order on the effective index of the light in silicon waveguides. A grating coupler is based on the Bragg self-interference of an optical signal going through material with alternative effective index (see, e.g., Wikipedia article on Fiber Bragg Grating). A change in the effective index will change the Bragg interference wavelength, and thus the peak loss of the grating coupler. Thus, variation of effective index has consequences in variation of the peak wavelength of the grating coupler. The temperature has a known influence on the effective index. At 1310° K, the peak wavelength of a grating coupler has variation of ~0.1 nm for a 1° K (dlambda/dT ~0.1 nm/K), considering a variation of effective index of 7E−5°/K (dneff/K) in the silicon.

Thus, by applying a voltage to the optical grating coupler 11, Applicant is able to compensate the effect of temperature variation. By applying dynamically a voltage varying in function of the temperature, Applicant is able to create a temperature controlled loop to maintain the peak wavelength of the optical grating coupler 11. The compensation of the temperature can be done in addition to the modulation, and the temperature compensation is a slowly fluctuating bias (order <1 MHz), whereas the modulation signal is varying at frequency >1 Ghz Compensation of the Process Variability The thickness of a layer in a semiconductor is not uniform. There are center-border effects due to the technology used for semiconductor fabrication (i.e. etching, deposition, etc.). As a result, the characteristics of the optical grating coupler 11 are not uniform in a single wafer. Variation observed is up to 10 nm variation in peak wavelength. Thus by applying a constant voltage to the optical grating coupler 11, Applicant is able to compensate (i.e. detune) the effect of process variability. Process compensation can be apply in addition to temperature compensation and modulation.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An electro-optic device comprising:
   a photonic chip having an optical grating coupler at a surface thereof, the optical grating coupler comprising
      a first semiconductor layer of a first conductivity type and comprising a first base and a first plurality of fingers extending outwardly therefrom, and
      a second semiconductor layer of a second conductivity type comprising a second base and a second plurality of fingers extending outwardly therefrom and being interdigitated and in physical contact with said first plurality of fingers to define a plurality of semiconductor junction areas disposed between contacting sidewalls of the first plurality of fingers and the second plurality of fingers, said first and second pluralities of fingers having a non-uniform width; and a circuit coupled to said optical grating coupler and configured to apply a first voltage to each of the first plurality of fingers and a second voltage to each of the second plurality of fingers to change at least one optical characteristic of the optical grating coupler.

2. The electro-optic device of claim 1 wherein top surfaces of said first plurality of fingers extends vertically away from a substrate and past top surfaces of said second plurality of fingers to define a plurality of recesses filled with a dielectric material respectively aligned with said second plurality of fingers.

3. The electro-optic device of claim 1 wherein said first base has first and second ends; and wherein said first plurality of fingers progressively increase in width from the first end to the second end.

4. The electro-optic device of claim 1 wherein said first and second pluralities of fingers are curved.

5. The electro-optic device of claim 1 wherein said photonic chip comprises first and second terminals coupled respectively to said first and second bases and configured to respectively receive the first voltage and the second voltage.

6. The electro-optic device of claim 1 wherein the at least one optical characteristic comprises at least one of a peak power wavelength, an optical loss, and a refractive index.

7. The electro-optic device of claim 1 further comprising an optical element defining an optical path above said optical grating coupler.

8. The electro-optic device of claim 7 wherein said optical element comprises an optical fiber.

9. A method of making an electro-optic device comprising:

forming a photonic chip having an optical grating coupler at a surface thereof, the optical grating coupler comprising a first semiconductor layer of a first conductivity type and comprising a first base and a first plurality of fingers extending outwardly therefrom, and a second semiconductor layer of a second conductivity type comprising a second base and a second plurality of fingers extending outwardly therefrom and being interdigitated and in physical contact with the first plurality of fingers to define a plurality of semiconductor junction areas between facing surfaces of the first plurality of fingers and the second plurality of fingers, the first and second pluralities of fingers having a non-uniform width; and coupling a circuit to the optical grating coupler applying, using the circuit, a first voltage to each of the first plurality of fingers and a second voltage to each of the second plurality of fingers, the applying being configured to bias the plurality of semiconductor junction areas and change at least one optical characteristic of the optical grating coupler.

10. The method of claim 9 wherein the first plurality of fingers extends vertically past the second plurality of fingers to define a plurality of recesses respectively aligned with the second plurality of fingers.

11. The method of claim 9 wherein the first base has first and second ends; and wherein the first plurality of fingers progressively increase in width from the first end to the second end.

12. The method of claim 9 wherein the first and second pluralities of fingers are curved.

13. The method of claim 9 wherein the photonic chip comprises first and second terminals coupled respectively to the first and second bases.

14. The method of claim 9 wherein the at least one optical characteristic comprises at least one of a peak power wavelength, an optical loss, and a refractive index.

15. The method of claim 9 further comprising coupling an optical element to define an optical path above the optical grating coupler.

16. The method of claim 15 wherein the optical element comprises an optical fiber.

* * * * *